(12) United States Patent
Yamamoto et al.

(10) Patent No.: US 6,753,284 B2
(45) Date of Patent: Jun. 22, 2004

(54) SINTERED ALUMINA CERAMIC, METHOD FOR PRODUCING THE SAME, AND CUTTING TOOL

(75) Inventors: Hiroshi Yamamoto, Aichi (JP); Takeshi Mitsuoka, Aichi (JP); Kazuhiro Urashima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 16 days.

(21) Appl. No.: 10/198,956

(22) Filed: Jul. 22, 2002

(65) Prior Publication Data

US 2003/0027707 A1 Feb. 6, 2003

(30) Foreign Application Priority Data

Jul. 23, 2001 (JP) ........................................ 2001-221961

(51) Int. Cl.⁷ ..................... C04B 35/111; C04B 35/505
(52) U.S. Cl. ...................... 501/127; 501/152; 264/663
(58) Field of Search ............................... 501/127, 152; 264/663

(56) References Cited

U.S. PATENT DOCUMENTS

| | | | |
|---|---|---|---|
| 4,331,627 A | | 5/1982 | Yamamoto et al. ......... 501/152 |
| 5,384,293 A | | 1/1995 | Omori et al. ............... 501/128 |
| 5,902,763 A | * | 5/1999 | Waku et al. ................ 501/127 |
| 6,410,471 B2 | * | 6/2002 | Kaneyoshi .................. 501/152 |
| 6,417,127 B1 | * | 7/2002 | Yamamoto et al. ......... 501/153 |
| 6,620,756 B2 | * | 9/2003 | Mah et al. .................. 501/152 |

FOREIGN PATENT DOCUMENTS

| | | |
|---|---|---|
| AT | 392 064 B | 1/1991 |
| EP | 0 722 919 A1 | 7/1996 |
| EP | 1 053 983 A2 | 11/2000 |
| JP | 2951771 | 7/1999 |

OTHER PUBLICATIONS

Toshiyuki Takahashi et al, "Some Properties of Alumina Ceramics having Extremely Fine Grains", *"Powder and Powder Metallurgy"*, 40(8), 805–808, (1993).

Toshiyuki Takahashi et al, "Cutting Performance of White Ceramics Tools having High Strength", *Powder and Powder Metallurgy*, 41(1), 33–37, (1994).

* cited by examiner

Primary Examiner—Karl Group
(74) Attorney, Agent, or Firm—Sughrue Mion, PLLC

(57) ABSTRACT

A sintered alumina ceramic obtained by preparing a raw material powder mixture containing alumina and a Group 3A metal oxide or a Group 3A metal compound which provides a Group 3A metal oxide on heating, and firing said raw material powder mixture. The sintered ceramic contains alumina particles having an average particle diameter of 4.0 $\mu$m or smaller. In the sintered ceramic, the total content of alkali metal elements, alkaline earth metal elements, Si, and Ti as converted to oxides accounts for 0.1 mol or less with respect to 100 mols of alumina, the total peak intensity for the principal peaks for $ReAlO_3$ and $Re_3Al_5O_{12}$ (Re: Group 3A metal) amounts to from 1 to 75% of the intensity of the principal peak of alumina as measured by X-ray diffraction, and the relative density is 99.0% or higher with respect to the theoretical density.

12 Claims, 1 Drawing Sheet

SINTERED ALUMINA CERAMIC, METHOD FOR PRODUCING THE SAME, AND CUTTING TOOL

BACKGROUND OF THE INVENTION

1. Field of the Invention

The present invention relates to a sintered alumina ceramic and a method for producing the same, and to a cutting tool; in further detail, it relates to a sintered alumina ceramic having excellent strength and hardness at room temperature as well as at a temperature as high as 1000° C. or higher, to a method for producing the same, and to a cutting tool having high-speed cutting ability and resistance against chipping.

2. Description of the Related Art

Since alumina ceramics are high in hardness but have low affinity with iron as compared with silicon nitride based ceramics and exhibit high chemical stability, alumina ceramics show excellent abrasion resistance. Thus, cutting tools made of alumina ceramics have been widely used heretofore for high-speed finishing of steel and cast iron. On the other hand, due to relatively low strength and toughness, alumina ceramics suffer from problems of chipping when they are used as cutting tools.

As a sintered alumina ceramic that has overcome the above problems, there is known, for instance, an alumina-TiC based material the strength and toughness of which are improved by dispersing TiC particles in the alumina sintered ceramic. In the case of such an alumina-TiC based material, the resistance against chipping when used as a cutting tool is considerably improved by adding TiC. However, since TiC is inferior to alumina in oxidation resistance and chemical stability with respect to iron, there still is a problem of lowered abrasion characteristics. Further, a method is proposed comprising adding MgO, i.e., a grain growth inhibitor, to pure alumina, such that fine texture and increased strength may be realized (e.g., "Powder and Powder Metallurgy", 40(8), 805–808 (1993)).

Recently, however, further higher speed in cutting is required, and since the temperature of the blade front increases under such free cutting conditions, further improvement is required in high temperature hardness and high temperature strength. Since alumina-based tools proposed heretofore are insufficient in hardness and strength at high temperatures, they generate abrasion or flaking on high-speed cutting (at a cutting speed in a range of from 600 to 1000 m/min), and suffer problems of short tool life. Accordingly, there is a need to develop a sintered alumina ceramic having excellent strength and hardness at both room temperature and at high temperature, as well as an alumina-based tool having both high-speed cutting ability and resistance against chipping.

SUMMARY OF THE INVENTION

The present invention has been accomplished in the light of the aforementioned circumstances, and an object thereof is to provide a sintered alumina ceramic having excellent strength and hardness at room temperature as well as at a temperature as high as 1000° C. or higher, a method for producing the same, and a cutting tool having high-speed cutting ability and resistance against chipping.

The present inventors have extensively studied the relation between the sintered alumina ceramics and their properties, and as a result, have found that, by controlling the particle size of the alumina particles and the content of $SiO_2$ and other components contained in the sintered ceramic to a predetermined range, and by controlling the ratio of the peak intensity as measured by X-ray diffraction method of the specified compound of alumina and Group 3A metal oxide with respect to that of alumina contained in the sintered ceramic, both high strength and high hardness at room temperature and at high temperatures can be achieved; and that, when used in a cutting tool, can provide a cutting tool having both high-speed cutting ability and resistance against chipping.

The sintered alumina ceramic according to the present invention is characterized in that the alumina particles contained in the sintered ceramic have an average particle size of 4.0 μm or smaller, the total content of alkali metal elements, alkaline earth metal elements, Si, and Ti as converted to oxides account for 0.1 mol or less per 100 mols of alumina contained in the sintered ceramic, and the total peak intensity for the principal peaks for $ReAlO_3$ and $Re_3Al_5O_{12}$ (Re: Group 3A metal of Periodic Table) with respect to the intensity of the principal peak of alumina as measured by X-ray diffraction method and calculated according to the following equation fall in a range of from 1 to 75%:

$$(A+B) \times 100/C$$

where,

A: peak intensity of (112) diffraction peak of $ReAlO_3$,
B: peak intensity of (420) diffraction peak of $Re_3Al_5O_{12}$, and
C: peak intensity of (113) diffraction peak of alumina.

The cutting tool according to the present invention is characterized in that it is constructed of the sintered alumina ceramic of the present invention.

The method for producing a sintered alumina ceramic according to the present invention is a production method for the sintered alumina ceramic of the present invention above, and comprises preparing a raw material mixture of alumina and a Group 3A metal oxide or a Group 3A compound which provides a Group 3A metal oxide on heating, or a raw material mixture comprising a compound of alumina and a Group 3A metal oxide; producing a sintered ceramic having a relative density of 94.5 to 99.0% with respect to the theoretical density by firing the molding of the resulting raw material mixture; and subjecting the resulting product to hot isostatic pressing (which is referred to hereinafter as "HIP treatment") such that the relative density thereof becomes 99.0% or higher with respect to the theoretical density.

The sintered alumina ceramic according to the present invention possesses excellent strength and hardness at room temperature and at high temperatures of 1000° C. or higher. Further, the method for producing a sintered alumina ceramic according to the present invention easily enables obtaining sintered alumina ceramics having the excellent characteristics above. Furthermore, since a sintered alumina ceramic having excellent strength and hardness at room temperature and at high temperatures of 1000° C. or higher is employed, the cutting tool according to the present invention is equipped with both high-speed cutting ability and resistance against chipping, has long tool life, and can be favorably used for high-speed cutting.

DETAILED DESCRIPTION OF THE PREFERRED EMBODIMENTS

Figure 1:
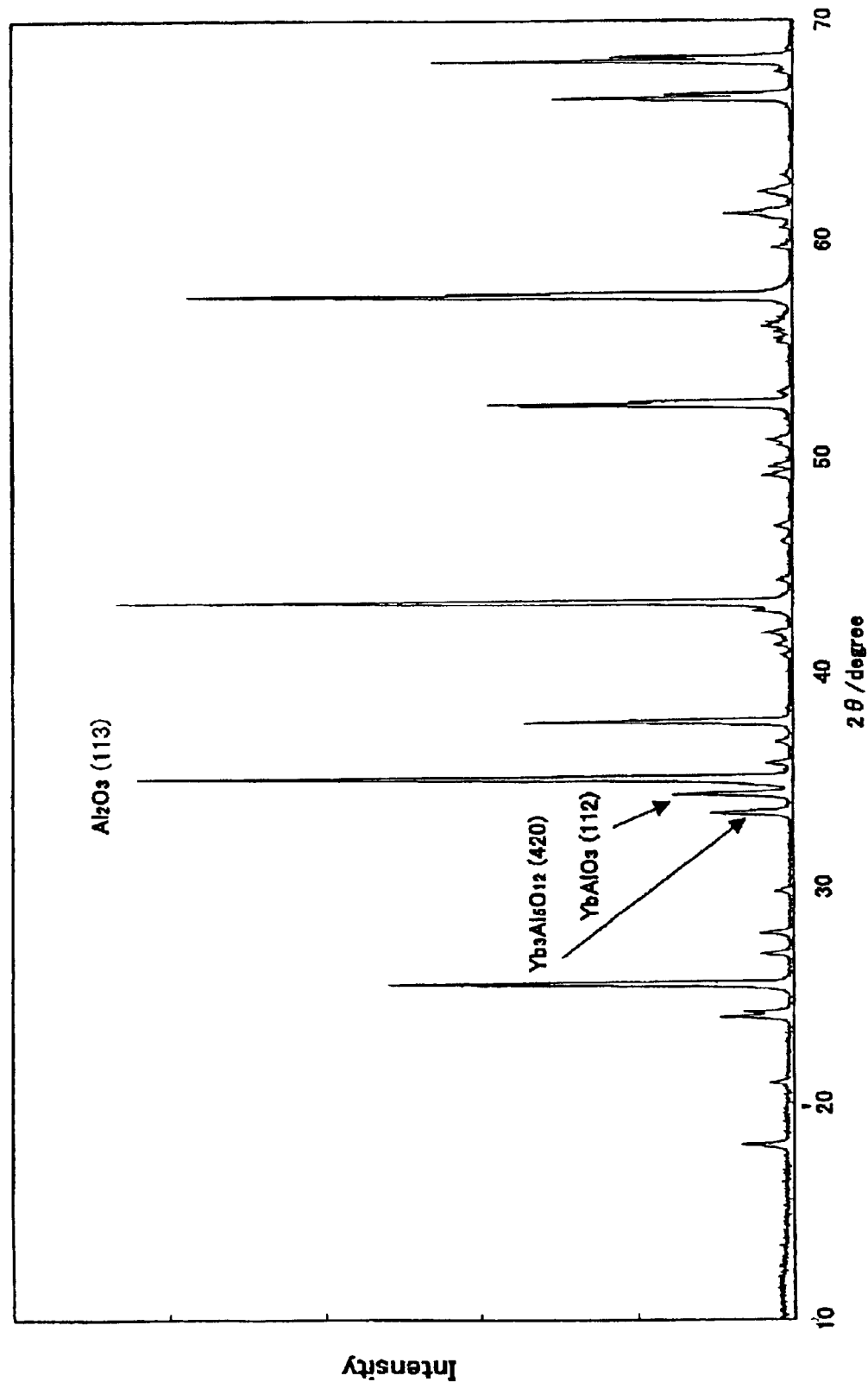
FIG. 1 is an XRD (x-ray diffraction) pattern of sintered alumina ceramic for sample No. 5.

In the sintered alumina ceramic according to the present invention, the average particle size of the "alumina particles" above is 4.0 µm or smaller, preferably from 0.3 to 3.0 µm, more preferably, from 0.3 to 2.0 µm, further preferably, from 0.5 to 1.8 µm, and most preferably, from 0.7 to 1.5 µm. A particle diameter exceeding 4.0 µm is not preferred, because the strength and the hardness of the sintered alumina ceramic at room temperature and high temperature decrease as to lower the fast cutting ability when used in a cutting tool. By setting the particle diameter to 3.0 µm or smaller, and particularly to 2.0 µm or smaller, the targeted strength and hardness can be obtained, and this improves not only the cutting ability, but also the workability in shaping the sintered ceramic into the shape of a cutting tool so as to reduce the processing cost. Furthermore, by setting the particle diameter to 0.3 µm or larger, the production process can be carried out at a lower cost because it allows use of inexpensive powder raw materials, and the addition of Group 3A metal oxides is preferred because it provides excellent strength and hardness at higher temperatures so as to improve the cutting performance when the blade temperature is elevated, for instance, in cutting hard materials, free cutting, etc.

The aforementioned "$ReAlO_3$" and "$Re_3Al_5O_{12}$" contained in the sintered alumina ceramic according to the present invention are compounds of alumina with an oxide of a Group 3A metal (Re) of Periodic Table. As the Group 3A metal oxides above, there can be mentioned, for instance, oxides of, Sc, Y, lanthanides (La, Ce, Nd, Sm, Eu, Gd, Dy, Ho, Er, Yb, etc.), etc., of which one or two or more types can be used. In particular, preferred among them from the viewpoint of ease in availability are the oxides of Y and lanthanides. Furthermore, in the sintered alumina ceramics according to the present invention, either one or both of "$ReAlO_3$" and "$Re_3Al_5O_{12}$" may be incorporated. Further, in the sintered alumina ceramics according to the present invention, other compounds of alumina and a Group 3A metal oxide, such as $Re_4Al_2O_9$ and the like, may be incorporated in addition to "$ReAlO_3$" and "$Re_3Al_5O_{12}$" above.

In the sintered alumina ceramic according to the present invention, the aforementioned "peak intensity for the principal peaks for $ReAlO_3$ and $Re_3Al_5O_{12}$ with respect to the intensity of the principal peak of alumina" is obtained by measuring the quantity of alumina, $ReAlO_3$, and $Re_3Al_5O_{12}$ (Re: Group 3A metal of the Periodic Table) by an X-ray diffraction method, in which calculation is made according to the following equation by using the thus obtained peak intensities:

$$(A+B) \times 100/C$$

A: peak intensity of (112) diffraction peak of $ReAlO_3$,
B: peak intensity of (420) diffraction peak of $Re_3Al_5O_{12}$, and
C: peak intensity of (113) diffraction peak of alumina.

In the sintered alumina ceramic according to the present invention, the ratio thus calculated in accordance with the equation above is in a range of from 1 to 75%, preferably from 1 to 60%, more preferably 5 to 40%, and particularly preferably, from 10 to 30%. When the ratio is lower than 1%, the quantity of the produced compound of alumina and Group 3A metal oxide is too small, and is not preferred because no improvement in chipping resistance is expected. When the ratio exceeds 75%, excessive segregated deposition of the compound of alumina and Group 3A metal oxide, the Group 3A metal oxide, or both may result. This leads to impaired strength and hardness at room temperature and at higher temperatures. This is not preferred, because tool life decreases as a result of flaking attributed to lowered strength, increased amount of abrasion due to lowered hardness, etc. When the total amount of 3A metal oxides forming $ReAlO_3$ and $Re_3Al_5O_{12}$ contained in the alumina ceramic is 0.2–2 mol % and when the X-ray diffraction peak intensity ratio expressed by $(A+B) \times 100/C$ is 1–75%, preferably 5–40%, the performance of the cutting tool is optimized enabling an extremely high speed cutting of more than 600 m/min without chipping (or flaking). The peak intensity is measured based on the X-ray diffraction method described in JIS K0131 (1996).

As the components of the sintered alumina ceramic according to the present invention, other components may be included so long as they do not inhibit the object of the present invention. Such other components may include an alkali metal oxide, an alkaline earth metal oxide, $SiO_2$, $TiO_2$, etc. However, although there is no particular limitation on the content of such other components in the sintered alumina ceramic according to the present invention, the total quantity as converted to oxides for alkali metals, alkaline earth metals, Si, and Ti is, 0.1 mol or lower, preferably 0.05 mol or lower, and more preferably 0.03 mol or lower, with respect to 100 mols of alumina contained in the sintered ceramic. The total quantity above preferably does not exceed 0.1 mol, because the strength and hardness at high temperatures decrease as to make it impossible to obtain the targeted sintered ceramic and tools.

The density of the alumina ceramics according to the present invention is preferably 3.98 g/cm³, and more preferably, 3.99 g/cm³ or higher (the upper limit is the theoretical density of the resulting alumina sintered ceramic). Setting the density in the above range is preferred, because the sintered ceramic can be sufficiently densified for improving strength and hardness, while also improving abrasion resistance. The relative density of the alumina ceramics according to the present invention with respect to the theoretical density is preferably 99.0% or higher, more preferably 99.6% or higher, further preferably 99.7% or higher, and particularly preferably, 99.8% or higher. Setting the density in the above range is preferred, because the residual pores in the sintered ceramic can be easily expelled and extinguished to result in complete extinction of residual pores in the sintered ceramic, thereby realizing a high density alumina ceramic cutting tool having excellent high temperature strength and high temperature hardness, suitable for high-speed cutting processing.

By providing the constitution above, the sintered alumina ceramic according to the present invention exhibits excellent strength and hardness at room temperature and at high temperatures. More specifically, the sintered alumina ceramic yields a Vicker's hardness at room temperature of 1800 or higher, preferably 1900 or higher, and more preferably, 1950 or higher, while yielding a Vicker's hardness at 1000° C. of 800 or higher, preferably 820 or higher, and more preferably, 850 or higher. Furthermore, the sintered alumina ceramic yields a bending strength at room temperature of 700 MPa or higher, preferably 750 MPa or higher, and more preferably, 780 MPa or higher, while yielding a bending strength at 1000° C. of 500 MPa or higher, preferably 510 MPa or higher, and more preferably, 520 MPa or higher, and yielding a bending strength at 1200° C. of 400 MPa or higher, preferably 450 MPa or higher, and more preferably, 480 MPa or higher.

There is no particular limitation concerning the method for obtaining the sintered alumina ceramic according to the present invention, and in general, it can be obtained by preparing a raw material mixture containing alumina and a Group 3A metal oxide, followed by shaping and firing the raw material mixture. Furthermore, instead of the Group 3A metal oxides above, a Group 3A metal compound may be used which provides a Group 3A metal oxide on heating. Such Group 3A metal compounds may include, for instance, organometallic compounds such as metal alkoxides, etc., as well as nitrates, carbonates, sulfates, hydroxides, etc. These may be in the form of a powder or a liquid. In addition to the above, a compound of alumina and a Group 3A metal oxide may be prepared in advance, and it may be dispersed in alumina such that the peak intensity range described above may be achieved. Furthermore, as the raw material for shaping the molding above, in general, a half-burnt powder obtained by firing the powder in a temperature range of from about 700 to 1100° C., preferably from about 800 to 1000° C., is used. However, this not limiting, and a starting raw material powder not subjected to firing may be used. When firing is carried out, each of the starting materials may be fired, or after mixing them, the mixture may be wholly fired and subjected to particle size control.

In the case of preparing a raw material mixture containing alumina and Group 3A metal oxides in obtaining the sintered alumina ceramic according to the present invention, there is no particular limitation concerning the addition amount of the Group 3A metal oxides above so long as a compound of alumina and Group 3A metal oxide can be precipitated in alumina. However, the amount with respect to 100 mols of alumina is, in general, in a range of from 0.1 to 2.0 mols, preferably from 0.2 to 1.0 mols, and more preferably, from 0.5 to 1.0 mols. By setting the addition amount of the Group 3A metal oxide in the range above, the amount of the compound of alumina and Group 3A metal oxide can be controlled to yield the proper precipitation amount described above. Furthermore, in the case of using a Group 3A metal compound which provides a Group 3A metal oxide on heating, the addition amount of thereof is set as such that the amount of the Group 3A metal compounds converted to Group 3A metal oxides falls in the range above.

The cutting tool according to the present invention follows the constitution above, and because it is constituted by a sintered alumina ceramic having excellent strength and hardness at room temperature and at high temperatures, it exhibits both high-speed cutting ability and resistance against chipping so as to prevent abrasion or flaking from occurring at high-speed cutting. Hence, it can be favorably used as cutting tools for use particularly at high-speed cutting.

As the alumina for use as the principal raw material in the production method for the sintered alumina ceramic according to the present invention, in general, a known alumina powder for structural materials can be used, and in particular, alumina having a purity of 99.99% or higher is preferred. Furthermore, in order to obtain a sintered ceramic not only exhibiting excellent strength and hardness at both room temperature and high temperatures, but also having improved workability for cutting tool shaping, an alumina powder is employed having a particle diameter of 1 $\mu$m or smaller, preferably such having a particle diameter in a range of from 0.8 to 0.1 $\mu$m, and more preferably, from 0.6 to 0.1 $\mu$m. In the case of using a powder having coarser granularity, the powder is size reduced before its use.

The "Group 3A metal oxide" above for use in the production method of the sintered alumina ceramic according to the present invention may include, for instance, oxides of Sc, Y, lanthanides (La, Ce, Nd, Sm, Eu, Gd, Dy, Ho, Er, Yb, etc.), etc., and one or two or more types thereof can be used. In particular, preferred among them are the oxides of Y and lanthanides. Further, the "Group 3A metal compound which provides a Group 3A metal oxide on heating" above may include, for instance, organometallic compounds such as metal alkoxides, etc., as well as nitrates, carbonates, sulfates, hydroxides, etc. Furthermore, as the raw material for shaping the molding above, in general, a half-burnt powder obtained by firing the powder in a temperature range of from about 700 to 1100° C., preferably from about 800 to 1000° C., is used, however, this not limiting, and a starting raw material powder not subjected to firing may be used. When firing is carried out, each of the starting materials may be fired, or after mixing them, the mixture may be wholly fired and subjected to particle size control.

In the production method of alumina ceramics according to the present invention, "alumina" and "a Group 3A metal oxides or a Group 3A metal compound which provides a Group 3A metal oxide on heating" above are blended and mixed to prepare the raw material mixture, and then, the mixture is shaped into a desired shape by using a known shaping method, for instance, mold pressing, extrusion molding, injection molding, cold isostatic pressing (CIP), etc. There is no particular limitation on the method for preparing the raw material mixture, and in addition to methods using a vibration mill, rotation mill, barrel mill, etc., wet mixing using alumina balls may be employed. In order to prevent the incorporation of impurities from occurring in this case, the use of alumina balls having a purity of 99.9% or higher is preferred. Should impurities such as alkali metal oxides, alkaline earth metal oxides, $SiO_2$, $TiO_2$, etc., become incorporated, in particular, the strength and hardness at high temperature become impaired as to make the desired sintered ceramic and tool unfeasible. Accordingly, it is more preferred to use alumina balls containing less than 0.1% in total of alkali metal oxides, alkaline earth metal oxides, $SiO_2$, and $TiO_2$.

In the production method for sintered alumina ceramic according to the present invention, firing is performed such that the relative density with respect to theoretical density before the HIP treatment falls in a range of 94.5 to 99.0%, preferably 95.0 to 98.5%, and more preferably, 96.0 to 98.0%. By suppressing the relative density on firing before the HIP treatment in a low range, but yet capable of applying HIP treatment in the later step, a sintered ceramic can be produced whose grain growth is suppressed and whose residual pores are minimized and distributed only in the grain boundaries. When the relative density exceeds 99.0%, alumina grain growth occurs, and the pores are taken inside the grains. As a result, the pores cannot be expelled in the later HIP treatment, and it unfavorably makes sintered alumina ceramic with high-speed cutting ability and chipping resistance unfeasible. On the other hand, a relative density lower than 94.5% is not preferred, because densification cannot be achieved in the later HIP treatment.

In the firing performed before HIP treatment above, there are no particular limitations on the conditions such as the firing temperature, time duration, atmosphere, etc. For instance, the firing temperature is generally set in a range of from 1200 to 1400° C., and preferably, from 1250 to 1350° C. By setting the firing temperature in such a low temperature range, the relative density of the sintered ceramic can be suppressed to a low range still capable of applying HIP treatment in the later step, so as to produce a sintered ceramic having suppressed grain growth and yet having minimized residual pores that are distributed only in the grain boundaries. Further, firing can be conducted under an oxidizing atmosphere such as air, etc., and the time of retaining at the firing temperature is from 0.5 to 5 hours, particularly, 1 to 3 hours.

Thereafter, the sintered alumina ceramic subjected to firing is subjected to HIP treatment so that the relative density with respect to the theoretical density becomes 99.0% or higher, preferably 99.6% or higher, more preferably 99.7% or higher, and particularly preferably, 99.8% or higher. In this manner, the residual pores in the sintered ceramic can be easily expelled and extinguished to result in complete extinction of residual pores in the sintered ceramic, and a high density alumina ceramic cutting tool is realized. A relative density lower than 99.0% is not preferred, because the resulting sintered alumina ceramic exhibits impaired strength and hardness at room temperature as well as at high temperatures. Further, there are no particular limitations concerning the conditions of the HIP treatment above so long as the sintered alumina ceramic according to the present invention is feasible. For instance, the temperature of the HIP treatment is generally from 1320 to 1550° C., and preferably, from 1350 to 1500° C. The pressure for HIP treatment is generally in the range of from 500 to 2000 kg/cm$^2$, and preferably, from 1000 to 2000 kg/cm$^2$. When HIP treatment is performed at a temperature lower than 1320° C. and/or under a pressure lower than 500 kg/cm$^2$, the sintered ceramic cannot be sufficiently densified, and it results in an alumina sintered ceramic with inferior strength, hardness, etc. On the other hand, when the treatment temperature exceeds 1550° C. and/or the pressure exceeds 2000 kg/cm$^2$, grain growth on secondary sintered ceramic, or abnormal grain growth occurs furthermore as to result in an alumina sintered ceramic having lowered strength and the like. Further, the HIP treatment above may be carried out under an inert atmosphere such as of nitrogen, argon, etc., and the retention time at the treatment temperature and pressure may be in a range of from 0.5 to 3 hours, and particularly, approximately in a range of from 1 to 2 hours.

EXAMPLES

The present invention is described in further detail by making reference to examples below. However, the present invention should not be construed as being limited thereto.

(1) Preparation of Sintered Alumina Ceramic

As the raw material powders, alumina powder (99.99% or higher purity and having an average particle diameter of 0.2 μm) was used together with additives of, Group 3A metal oxide powders, i.e., ytterbium oxide ($Yb_2O_3$) and yttrium oxide ($Y_2O_3$), magnesium oxide powder, titanium oxide powder, and silicon oxide powder. The additives above were mixed with 100 mols of alumina powder at molar ratios as shown in Table 1 (no additives were added in sample No. 11). Each of the mixtures was subjected to wet mixing using high purity alumina balls (99.9% purity) and water as the solvent, and after adding a binder (acrylic) if necessary, each of the mixtures was obtained by spray drying. Thereafter, the resulting mixtures were each molded into predetermined shapes, and were subjected to firing and HIP treatment under the conditions shown in Table 1 to obtain sintered alumina ceramics for samples Nos. 1 to 16. In the process above, all of the samples were fired in air, and the retention time at the firing temperature was set to 2 hours. The HIP treatment was performed in argon, and the retention time was set to 1 hour.

The sintered density of the sintered alumina ceramics Nos. 1 to 16 was measured by Archimedes' method in accordance with JIS R1634(1998) (the values were rounded up to two digits below decimal point in accordance with JIS Z8401(1999)). The relative density was obtained by taking the sintered density of the completely densified sintered ceramic after the HIP treatment as 100%. The results are given in Table 1 below.

TABLE 1

| Sample No. | Additive | Quantity (mol ratio) | Firing temp. (° C.) | Primary density (g/cm$^3$) | Relative density (%) | HIP temp. (° C.) | HIP pressure (kg/cm$^2$) | Density after HIP (g/cm$^3$) | Relative Density (%) |
|---|---|---|---|---|---|---|---|---|---|
| 1 | $Yb_2O_3$ | 0.20 | 1320 | 3.83 | 95.8 | 1400 | 1000 | 4.00 | 100.0 |
| 2 | $Yb_2O_3$ | 0.50 | 1340 | 3.92 | 97.3 | 1400 | 1000 | 4.03 | 100.0 |
| 3 | $Yb_2O_3$ | 0.50 | 1340 | 3.92 | 97.3 | 1450 | 1000 | 4.03 | 100.0 |
| 4 | $Yb_2O_3$ | 1.00 | 1340 | 3.88 | 95.3 | 1350 | 1000 | 4.07 | 100.0 |
| 5 | $Yb_2O_3$ | 1.00 | 1340 | 3.88 | 95.3 | 1400 | 1000 | 4.07 | 100.0 |
| 6 | $Yb_2O_3$ | 1.00 | 1350 | 3.95 | 97.0 | 1450 | 1000 | 4.07 | 100.0 |
| 7 | $Yb_2O_3$ | 1.00 | 1340 | 3.89 | 97.0 | 1450 | 1000 | 4.01 | 100.0 |
| 8 | $Yb_2O_3$ | 2.00 | 1355 | 4.06 | 97.6 | 1500 | 1000 | 4.16 | 100.0 |
| 9 | $Yb_2O_3$ | 0.50 | 1400 | 3.98 | 98.7 | 1450 | 1000 | 4.01 | 99.5 |
| *10 | $Yb_2O_3$ | 1.00 | 1350 | 3.95 | 97.0 | 1600 | 1000 | 4.07 | 100.0 |
| *11 | none | | 1250 | 3.86 | 96.7 | 1200 | 1000 | 3.99 | 100.0 |
| *12 | MgO | 0.10 | 1240 | 3.86 | 96.7 | 1200 | 1000 | 3.99 | 100.0 |
| *13 | $TiO_2$ | 0.10 | 1240 | 3.86 | 96.7 | 1200 | 1000 | 3.99 | 100.0 |
| *14 | $SiO_2$ $Yb_2O_3$ | 0.15 0.50 | 1360 | 3.92 | 97.3 | 1450 | 1000 | 4.03 | 100.0 |
| *15 | $Yb_2O_3$ | 3.00 | 1370 | 4.13 | 97.5 | 1550 | 1000 | 4.24 | 100.0 |
| *16 | $Yb_2O_3$ | 0.50 | 1250 | 3.75 | 93.1 | 1450 | 1000 | 3.79 | 94.0 |

(2) Performance Evaluation of Sintered Alumina Ceramic

Measurements were made for each of the sintered alumina ceramics Nos. 1 to 16 on average particle diameter of the alumina particles, ratio of peak intensity, bending strength at room temperature, bending strength at 1000° C. and 1200° C., hardness at room temperature, and hardness at 1000° C. The results are given in Table 2 below. The XRD pattern for sample No. 5 is shown in FIG. 1.

<1>Average Particle Diameter of Alumina Particles (μm)

The sintered alumina ceramics Nos. 1 to 16 were each mirror polished, and after applying thermal etching, were observed by SEM (scanning electron microscope). The particle diameter was calculated from the SEM photographs according to the intercept method.

<2>Ratio of Peak Intensity (%)

The sintered alumina ceramics Nos. 1 to 16 were each subjected to XRD measurement, and the ratio of peak intensity was obtained from the thus obtained peak intensities according to the equation described above.

<3>Bending Strength at Room Temperature, and Bending Strength at 1000° C. and 1200° C. (MPa)

The bending strength at room temperature for each of the sintered alumina ceramics Nos. 1 to 16 was obtained by the three-point bending strength measurement method according to JIS R1601 (1995), and the bending strength at 1000° C. and 1200° C. was obtained by three-point bending strength measurement method according to JIS R1604 (1995).

<4>Hardness at Room Temperature and Hardness at 1000° C. (HV1)

The hardness at room temperature for each of the sintered alumina ceramics Nos. 1 to 16 was obtained by the Vicker's hardness measurement method according to JIS R1601 (1991) under a load of 9.807N. The high temperature hardness for each of the sintered alumina ceramics Nos. 1 to 16 was obtained by the Vicker's hardness measurement method according to JIS R1623 (1995) under a load of 9.807N in vacuum.

(3) Preparation of Cutting Tool and Performance Evaluation

Each of the sintered alumina ceramics Nos. 1 to 16 above was worked into a SNGN432 shape, and a cutting performance test was carried out on casting iron according to the method described below. The results are given in Table 2. No performance evaluation was carried out on sample No. 16 because its density was too low.

<1>High-Speed Cutting Performance Test

High-speed cutting was carried out three times each for the samples under the conditions below, and the average value was obtained for the number of threads passed and cut by the sample before flaking occurred.

Cutting conditions: Work; Cylindrical cast iron (100 mm dia.), Cutting speed V=1000 m/min; Feed f=0.30 mm/rev; cut d=2.0 mm; dry.

<2>Chipping Resistance Test

An intermittent cutting test was carried out 5 times each for the samples under the conditions below, and the average value for the sample to pass the threads was obtained.

Cutting conditions: Work; Cylidrical cast iron (200 mm dia.) having threads (10 mm spaced), Cutting speed V=500 m/min; Feed f=0.35 mm/rev; cut d=1.5 mm; dry.

TABLE 2

| Sample No. | Particle diameter (μm) | Particle diameter of dispersed phase (μm) | Peak intensity ratio (%) | 3 point bending strength (MPa) | | | Hardness (HV1) | | High-speed cutting performance (m) | Chipping resistance (threads) |
|---|---|---|---|---|---|---|---|---|---|---|
| | | | | R.T. | 1000° C. | 1200° C. | R.T. | 1000° C. | | |
| 1 | 1.0 | — | 4 | 800 | 570 | 520 | 2000 | 940 | 905 | 2.6 |
| 2 | 0.7 | — | 15 | 820 | 580 | 530 | 2040 | 940 | 1530 | 2.5 |
| 3 | 1.3 | 0.4 | 15 | 780 | 520 | 480 | 1990 | 820 | 850 | 7.3 |
| 4 | 0.5 | — | 26 | 850 | 590 | 530 | 2080 | 990 | 1540 | 2.5 |
| 5 | 1.0 | — | 26 | 800 | 580 | 520 | 2010 | 950 | 910 | 4.6 |
| 6 | 1.3 | 0.4 | 26 | 780 | 530 | 480 | 2010 | 850 | 880 | 7.3 |
| 7 | 1.3 | — | 24 | 750 | 510 | 450 | 1950 | 810 | 820 | 7.0 |
| 8 | 1.3 | — | 54 | 740 | 500 | 430 | 1900 | 800 | 800 | 6.8 |
| 9 | 1.4 | — | 15 | 700 | 480 | 390 | 1900 | 780 | 350 | 1.8 |
| *10 | 4.8 | — | 26 | 500 | 380 | 340 | 1600 | 650 | 240 | 4.8 |
| *11 | 0.5 | — | 0 | 870 | 580 | 230 | 2140 | 750 | 345 | 1.2 |
| *12 | 0.5 | — | 0 | 860 | 580 | 240 | 2120 | 770 | 233 | 1.1 |
| *13 | 0.5 | — | 0 | 840 | 590 | 230 | 2120 | 770 | 246 | 1.1 |
| *14 | 1.0 | — | 15 | 800 | 550 | 220 | 1990 | 740 | 210 | 1.0 |
| *15 | 1.3 | — | 80 | 650 | 400 | 350 | 1850 | 740 | 280 | 1.5 |
| *16 | — | — | 12 | — | — | — | — | — | — | — |

Table 2 shows that the samples Nos. 1 to 9 according to the present invention yield a bending strength at room temperature in the range of 700 to 850 MPa, at 1000° C. in the range of 480 to 590 MPa, and at 1200° C. in the range of 390 to 530 MPa; they yield a Vicker's hardness at room temperature in the range of 1900 to 2080, and at 1000° C. in the range of 780 to 990. From these results, it can be understood that samples Nos. 1 to 8 according to the present invention are sintered alumina ceramics having excellent strength and hardness at room temperature and at high temperatures. In particular, it can be understood from Table 1 that, as compared with sample No. 9 having a low relative density of 99.5% with respect to the theoretical density of the sintered ceramic, samples Nos. 1 to 8 having a relative density as high as 100% yield superior values for bending strength at room temperature in the range of 740 to 850 MPa, at 1000° C. in the range of 500 to 590 MPa, and at 1200° C. in the range of 430 to 530 MPa; and on Vicker's hardness at room temperature in the range of 1900 to 2080, and at 1000° C. in the range of 800 to 990.

Furthermore, from Table 2, samples Nos. 1 to 7 having a peak intensity ratio of 50% or lower yield higher values for three-point bending strength and hardness as compared with the values for sample No. 8. On comparing sample No. 1 with No. 5, it can be understood that sample No. 5 yielding the higher peak intensity of 26% as compared with that of sample No. 1 (4%) exhibits superior strength and hardness for both room temperature and high temperatures. Further, on comparing samples Nos. 4 to 6 differing in alumina particle diameter in the sintered ceramic, it can be seen that sample No. 4 having a particle diameter of 0.5 μm and sample No. 5 having a particle diameter of 1.0 μm show superior strength and hardness for both room temperature and high temperatures as compared with sample No. 6 having a particle diameter of 1.3 μm, and that the values are higher for sample No. 4. Hence, it can be understood that sintered alumina ceramics having particularly superior strength and hardness for both room temperature and high temperatures can be obtained by limiting the particle diameter of alumina in the range described above.

In contrast to the above, Table 2 shows that sample No. 15 having a high peak intensity ratio of 80% yields lower strength and hardness for both room temperature and high temperatures as compared with samples Nos. 1 to 9. Similarly, it can be understood that sample No. 10 having a large particle diameter of 4.8 μm for the alumina particles also yields extremely low strength and hardness for both room temperature and high temperatures as compared with sample Nos. 1 to 9. Furthermore, in samples Nos. 11 to 13 not using the Group 3A metal oxide, the strength for both room temperature and 1000° C. and the hardness for room temperature are about the same as those of samples Nos. 1 to 9. However, the bending strength at 1200° C. and the hardness at 1000° C. are inferior to those of samples Nos. 1 to 9. Hence, it can be understood that these samples are inferior in strength and hardness at high temperature region. Furthermore, sample No. 14 containing $SiO_2$ at a larger quantity with respect to alumina similarly yields lower values for bending strength at 1200° C. and hardness at 1000° C. as compared with those of samples Nos. 1 to 9, and it can be understood that the sample No. 14 is inferior in strength and hardness at a high temperature region.

Furthermore, as shown in Table 2, the cutting performance was evaluated for the sintered alumina ceramic samples Nos. 1 to 9 according to the present invention. In the high-speed cutting performance test, the average value of cutting distance to the occurrence of flaking was found to yield large values in the range of 350 to 1540 m, and in the chipping resistance test, the average value of threads passed prior to flaking was found to yield large values in the range of 1.8 to 7.3. From these results, it can be understood that the sintered alumina ceramic samples Nos. 1 to 9 according to the present invention are useful as cutting tool materials having high-speed cutting ability and chipping resistance. In particular, as compared with sample No. 9, samples Nos. 1 to 8 yield large average values of cutting distance to the occurrence of flaking in the range of 800 to 1540 m in the high-speed cutting performance test, and large average values of threads passed prior to flaking in the range of 2.5 to 7.3. Hence, it can be understood that they are useful as cutting tool materials suitable for high-speed cutting.

In contrast to above, although sample No. 10 yields an average value of threads passed prior to flaking as high as 4.8 and exhibits chipping resistance, the average value of cutting distance to flaking in the high-speed cutting performance is extremely low as to yield 240 m due to low strength and hardness for both room temperature and high temperatures. Hence, it can be understood that sample No. 10 is not suitable for high-speed cutting. Furthermore, in samples Nos. 11 to 15, the average values of cutting distance to the occurrence of flaking and the average values of threads passed prior to flaking are low, and hence, it can be understood that these samples are not suitable for high-speed cutting.

The present invention is not only limited to those shown specifically as examples above, and can be applied to a variety of examples that are changed depending on the object and usages. For instance, in the method for producing the sintered alumina ceramic according to the present invention, in addition to alumina, a Group 3A metal oxide, a Group 3A metal compound which yields a Group 3A metal oxide, or compound of alumina and Group 3A metal oxide, a component other than those enumerated above can be added.

It should further be apparent to those skilled in the art that various changes in form and detail of the invention as shown and described above may be made. It is intended that such changes be included within the spirit and scope of the claims appended hereto.

This application is based on Japanese Patent Application No. 2001-221961 filed Jul. 23, 2001, the disclosure of which is incorporated herein by reference in its entirety.

What is claimed is:

1. A sintered alumina ceramic substantially consisting of alumina, $ReAlO_3$ and $Re_3Al_5O_{12}$ wherein:

the alumina particles contained in the sintered ceramic have an average particle size of 4.0 μm or smaller and more than 1 μm;

the total content of alkali metal elements, alkaline earth metal elements, Si, and Ti, as convened to oxides, account for 0.1 mol or less per 100 mol of alumina contained in the sintered ceramic; and the total peak intensity for the principal peaks for $ReAlO_3$ and $Re_3Al_5O_{12}$, where Re is a Group 3A metal of Periodic Table, with respect to the intensity of the principal peak of alumina as measured by X-ray diffraction and calculated according to the following equation fall in a range of from 1 to 75%:

$$(A+B)100/C$$

where: A is the peak intensity of the (112) diffraction peak of $ReAlO_3$, B is the peak intensity of the (420) diffraction peak of $Re_3Al_5O_{12}$, and C is the peak intensity of the (113) diffraction peak of alumina.

2. The sintered alumina ceramic as claimed in claim 1, which is obtained by: preparing a raw material mixture of alumina and an oxide or compound of Group 3A metal of Periodic Table which compound provides a Group 3A metal oxide on heating, or a raw material mixture comprising a compound of alumina and a Group 3A metal oxide; and then firing said raw material mixture.

3. The sintered alumina ceramic as claimed in claim 1, which has a Vicker's hardness of 1800 or higher at room temperature and has a Vicker's hardness of 800 or higher at 1000° C.

4. The sintered alumina ceramic as claimed in claim 1, which has a bending strength of 700 MPa or higher at room temperature, a bending strength of 500 MPa or higher at 1000° C., and a bending strength of 400 MPa or higher at 1200° C.

5. A cutting tool constructed of the sintered alumina ceramic as claimed in claim 1, wherein the relative density of the sintered alumina ceramic is 99.0% or higher with respect to the theoretical density.

6. A method for producing the sintered alumina ceramic as claimed in claim 1, comprising:

preparing a raw material mixture of alumina and a Group 3A metal oxide or a Group 3A compound which provides a Group 3A metal oxide on heating, or a raw material mixture comprising a compound of alumina and a Group 3A metal oxide;

producing a sintered ceramic having a relative density of 94.5 to 99.0% with respect to the theoretical density by firing a molding of the prepared raw material mixture; and subjecting the resulting product to hot isostatic pressing such that the relative density thereof becomes 99.0% or higher with respect to its theoretical density.

7. The method as claimed in claim 6 for producing the sintered alumina ceramic, wherein the raw material mixture above is prepared by wet mixing using alumina balls having purity of 99.9% or higher.

8. The method as claimed in claim 6 for producing the sintered alumina ceramic, wherein the raw material mixture is prepared by wet mixing using alumina balls containing less than 0.1% in total of an alkali metal oxide, an alkaline earth metal oxide, $SiO_2$, and $TiO_2$.

9. A cutting tool constructed of the sintered alumina ceramic as claimed in claim 1, wherein said Re is selected from the group consisting of Sc, Y, La, Ce, Nd, Sm, Eu, Gd, Dy, Ho, Er, Yb and mixtures thereof.

10. A cutting tool constructed of the sintered alumina ceramic as claimed in claim 1, wherein said Re is selected from the group consisting of Y, Yb or a mixture thereof.

11. The sintered alumina ceramic as claimed in claim 1, wherein the alumina particles contained in the sintered ceramic have an average particle size of 1.3 µm to 4.0 µm.

12. The sintered alumina ceramic as claimed in claim 1, wherein the alumina particles contained in the sintered ceramic have an average particle size of 1.4 µm to 4.0 µm.

* * * * *